United States Patent [19]

Corbett et al.

[11] 4,188,160
[45] Feb. 12, 1980

[54] FEED RESIDUE SAVER FOR COMBINES

[76] Inventors: Wendell E. Corbett, Box 711; Jay D. Sutton, 323 First Ave., S.W., both of Watertown, S. Dak. 57201

[21] Appl. No.: 853,562

[22] Filed: Nov. 21, 1977

Related U.S. Application Data

[63] Continuation-in-part of Ser. No. 772,002, Feb. 25, 1977, abandoned.

[51] Int. Cl.² ............................................. B65G 53/04
[52] U.S. Cl. ..................................... 406/58; 56/13.3; 130/27 F; 406/102
[58] Field of Search ...................... 130/27 F; 56/13.3; 302/8, 37; 406/57, 58, 100, 102

[56] References Cited

U.S. PATENT DOCUMENTS

| | | | |
|---|---|---|---|
| 1,841,718 | 1/1932 | Edwards, Jr. ........................ | 56/13.3 |
| 2,433,162 | 12/1947 | Scranton et al. .................... | 130/27 F |
| 3,159,958 | 12/1964 | Mathews ............................... | 56/13.3 |
| 3,202,154 | 8/1965 | Viebrock .............................. | 130/27 F |
| 3,952,889 | 4/1976 | Wanker et al. ..................... | 56/14.6 X |

Primary Examiner—John F. Pitrelli
Assistant Examiner—Daniel J. Leach
Attorney, Agent, or Firm—Wegner, Stellman, McCord, Wiles & Wood

[57] ABSTRACT

A feed residue saver attachment for combines has a trough adapted to be mounted in a transverse position beneath the rearward portion of a combine to receive residue which the combine would otherwise discharge onto the ground. A driven auger in the trough moves residue out an open end and into an impeller housing from which it is blown through a duct into a wagon. The attachment has alternative modes of operation so that it may be selectively used either to save substantially all the feed residue including chaff, or to save substantially only large material such as corn cobs, corn husks and pieces of stalk (known in some farming areas as "husklage") and permit chaff and other fine material to drop to the ground.

8 Claims, 5 Drawing Figures

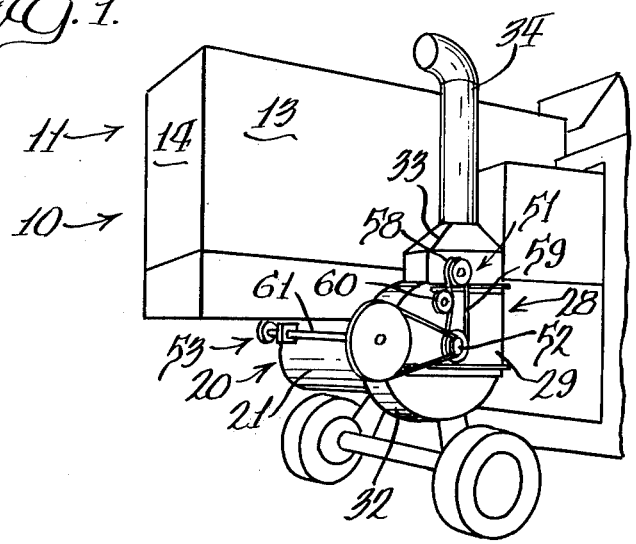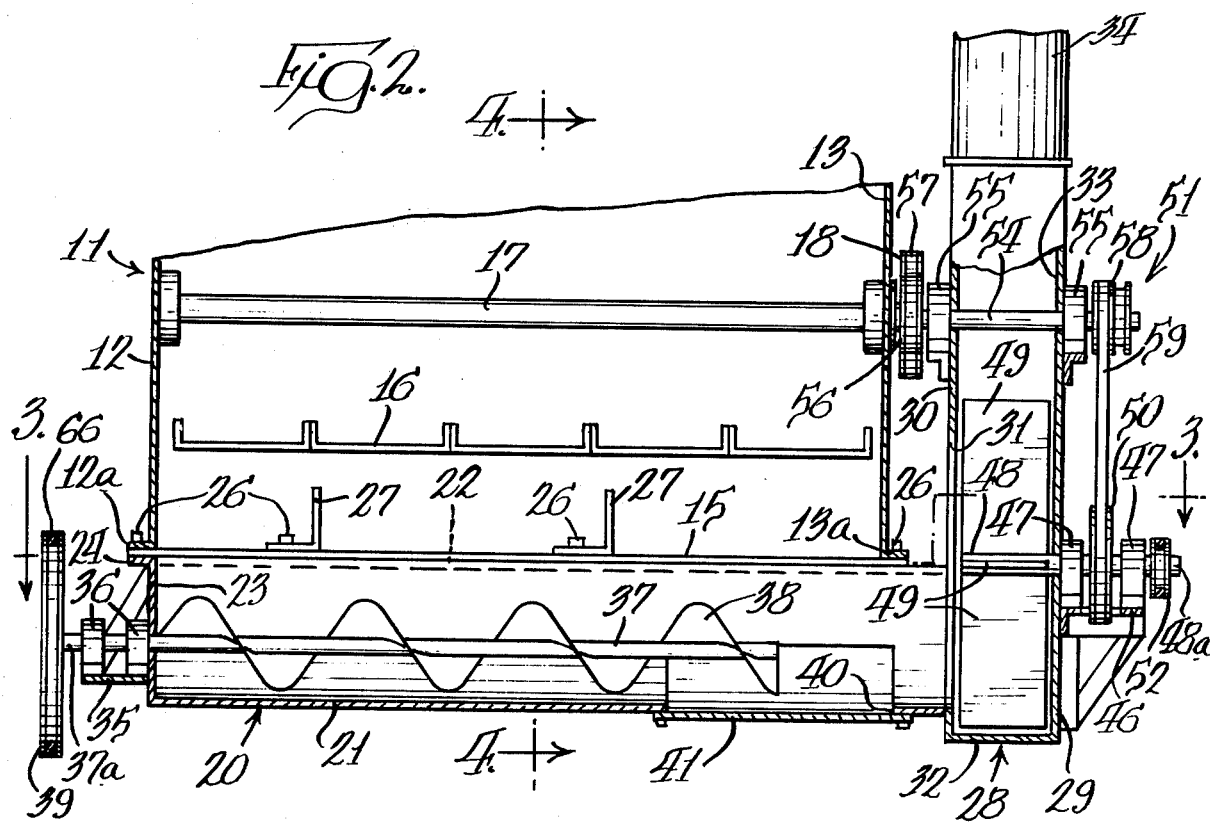

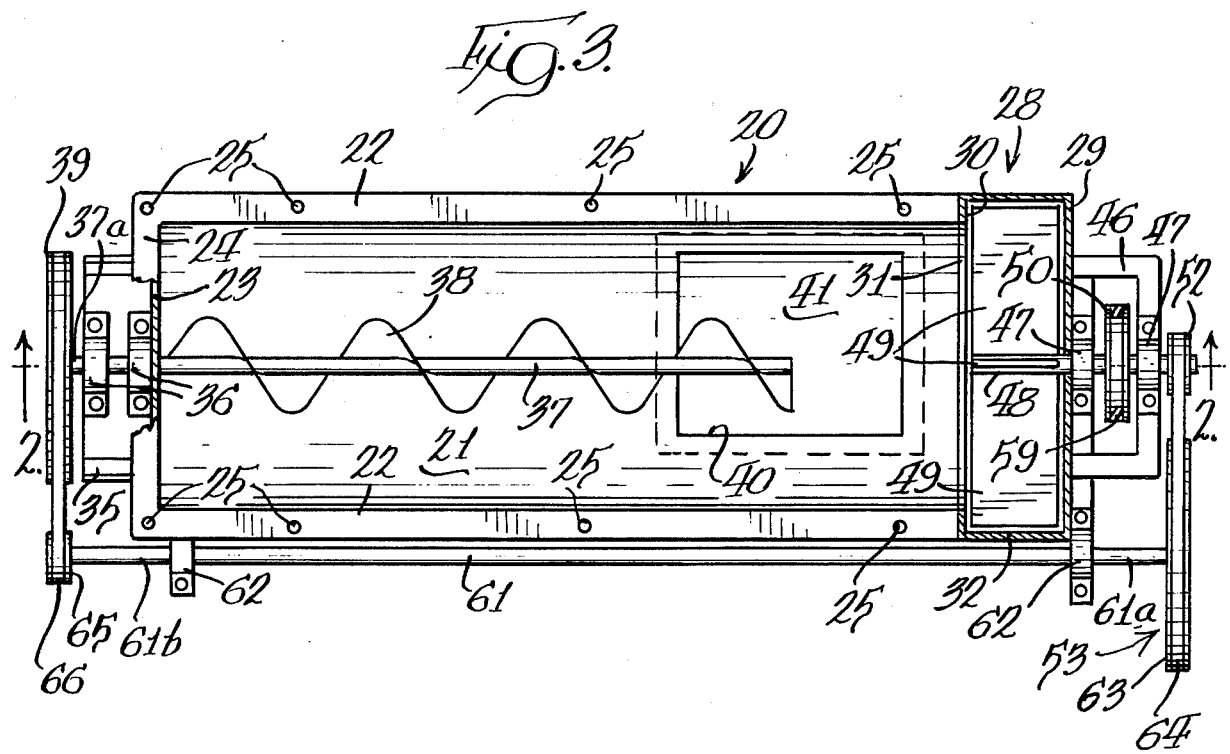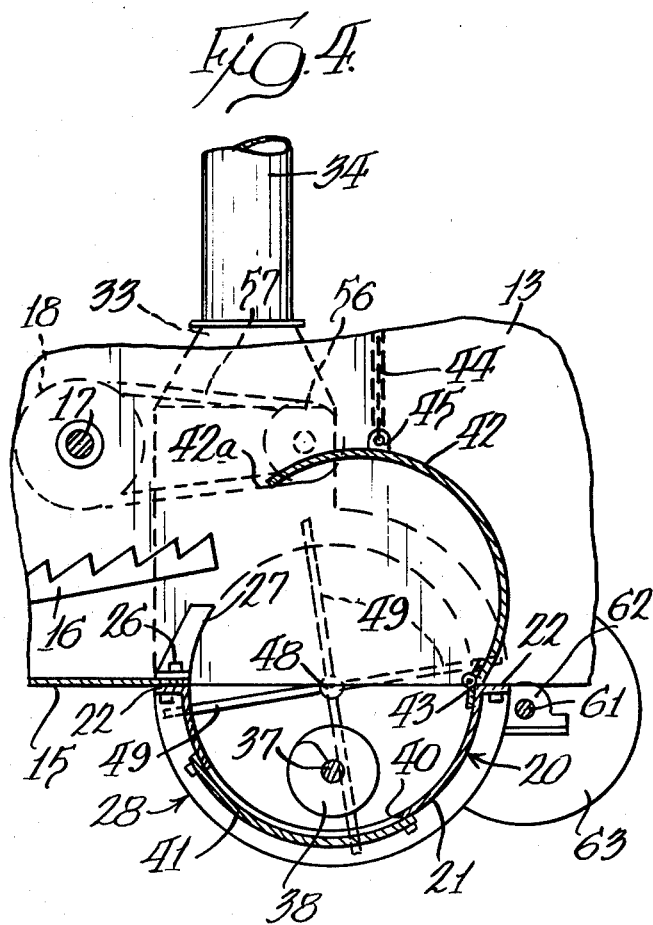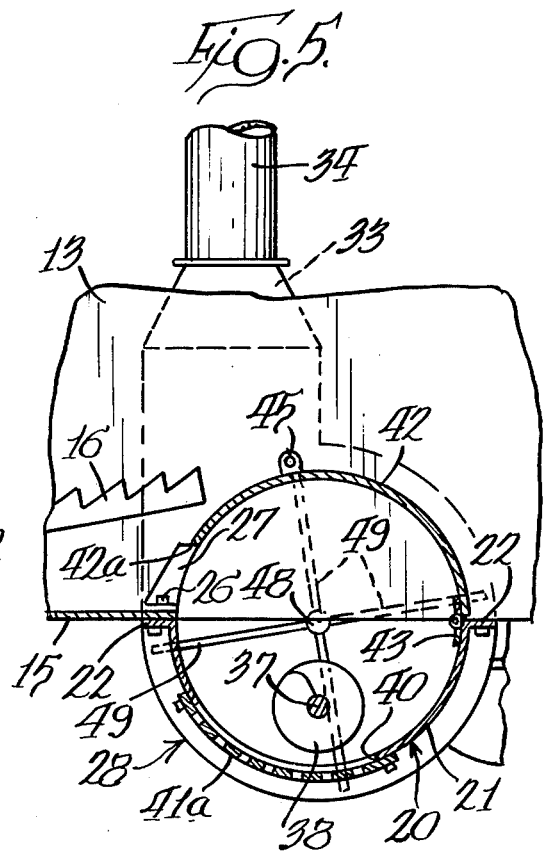

FEED RESIDUE SAVER FOR COMBINES

CROSS-REFERENCE TO RELATED APPLICATION

This application is a continuation-in-part of our co-pending application Ser. No. 772,002, filed Feb. 25, 1977, now abandoned.

BACKGROUND OF THE INVENTION

Combines are, of course, used to harvest crops and also to separate the edible parts of a crop from the rest of it. By the use of various attachments, a combine may be used for harvesting small grain such as wheat and rice; for harvesting edible beans and soy beans; for harvesting corn for silage in which the husks are removed, leaving the cobs with the grain intact; or for husking and shelling corn so that the grain is removed from the cobs.

Regardless of the purpose for which a combine is used, it delivers the usable end product to grain tanks and drops a large amount of residual material onto the ground where it is plowed into the soil. When small grain is combined the residue consists principally of chaff, together with a small amount of grain which has not been picked up for feeding into the grain tank. Straw is usually discharged separately, and may be saved for use as bedding or may be discharged onto the ground, either in long pieces or after passing through an auxiliary straw chopper.

In bean harvesting, the beans are delivered to the grain tank, while stems, leaves and other parts, together with some beans not picked up for transfer to the grain tank, constitute the residue.

When corn is harvested and processed for silage, the residue consists principally of husks, together with finer parts of the plants. In the harvesting and shelling of corn, the residue includes small material plus the cobs and the husks.

In all cases, the residue normally returned to the soil by a combine contains substantial quantities of usable material, much of which is even usable as animal feed.

SUMMARY OF THE INVENTION

The principal object of the present invention is to provide an attachment for combines which saves the feed residue now ordinarily dropped on the ground.

Another object of the invention is to provide an attachment which may be fastened to the underside of a combine, toward the rear, and which may easily be connected to be driven from an existing driven shaft of the combine.

Still another object of the invention is to provide an attachment which may be used selectively either to save all material including chaff and other very fine particles, or which may be used to salvage only such material as the cobs, husks, etc., when the combine is being used to harvest and shell corn.

Yet another object of the invention is to provide an attachment which may be applied to combines of different manufacture, and different models of combines, and which may be relatively easily arranged to be driven from an existing shaft or shafts of any of a variety of combines.

THE DRAWINGS

FIG. 1 is a fragmentary perspective view of the rear portion of a combine with the attachment mounted thereon;

FIG. 2 is a fragmentary, vertical, transverse sectional view looking toward the front of the combine as seen in FIG. 1, and taken substantially as indicated along the line 2—2 of FIG. 3;

FIG. 3 is a plan view of the attachment, partly in section, taken substantially as indicated along the line 3—3 of FIG. 2, and with the deflector plate seen in FIGS. 4 and 5 removed from the attachment;

FIG. 4 is a fragmentary longitudinal sectional view taken substantially as indicated along the line 4—4 of FIG. 2 with a deflector plate in an elevated position for use of the attachment in saving substantially all residue including chaff, and a solid closure in the bottom of the attachment trough; and FIG. 5 is a view similar to FIG. 4 with the deflector plate in a lowered position and a grating substituted for the solid closure, as the attachment is set up to save only large material such as cobs, husks, etc.

DETAILED DESCRIPTION OF THE INVENTION

Referring to the drawings in detail, and referring first to FIGS. 1 to 3, a combine, indicated generally at 10, includes a casing, indicated generally at 11, which has a left sidewall 12, a right sidewall 13, a rear wall 14, and a bottom wall 15 (FIGS. 4 and 5) which terminates a substantial distance forward of the rear wall 14. Thus, the rearward portion of the combine casing 11, behind the bottom wall 15, is downwardly open so that material fed off the rear of the chaffer screen 16 and straw-walkers (not shown) ordinarily drops onto the ground.

Somewhere in the rearward area of any combine is an output shaft, indicated in FIGS. 2 and 4 at 17, which extends through one of the casing sidewalls 12 or 13, or in some cases through both sidewalls, and has outside a sidewall a pulley 18 for driving an attachment such, for example, as a straw chopper. The present attachment either takes its power from the pulley 18; or if the combine is provided with a straw chopper or other attachment which is driven off the pulley 18, then a double groove pulley is substituted for the pulley 18 so that both the straw chopper and the attachment of the present invention may be driven off the shaft 17.

The attachment of the present invention consists of a trough, indicated generally at 20, which has a semi-cylindrical body 21 that has side flanges 22, and an end wall 23 provided with a flange 24. The flanges 22 and 24 are provided with bolt holes 25 so that the trough 20 may be detachably mounted beneath the rearward portion of the combine casing 11 by means of bolts 26 which impale holes drilled in the combine casing floor 15 and in casing sidewall flanges 12a and 13a in register with the bolt holes 25. Secured by two of the bolts 26 which are between the casing sidewalls 12 and 13 are upright stops 27 the purpose of which will be described hereinafter.

The end of the trough 20 opposite the wall 23 is open, and communicates with the interior of an impeller housing, indicated generally at 28. The impeller housing includes an outer sidewall 29, an inner sidewall 30 provided with an inlet opening 31, and a circumferential wall 32 which connects the walls 29 and 30 and has at its upper end a discharge opening 33 which communicates with a material discharge duct 34. Any suitable discharge conduit (not shown) may be secured to the free end of the duct so that material discharged by the impeller is dropped into a residue container such as a wagon trailing behind the combine or a container secured to the combine casing 11.

As seen in FIGS. 2 and 3, outside the trough end wall 23 is a bracket 35 which supports a pair of spaced bearing blocks 36 in which an auger shaft 37 is journalled. The shaft 37 extends through the trough end wall 23 and is provided with a helical auger 38 so that rotation of the auger shaft 37 causes the auger to serve as conveyor means to move material along the trough 20 toward the impeller housing infeed opening 31. An outer end portion 37a of the shaft 37 extends outwardly beyond the outer bearing block 36 and is provided with a pulley 39.

The bottom of the trough 21, adjacent the impeller infeed opening 31, is provided with a large rectangular opening 40. The opening 40 is covered alternatively with a solid closure plate 41 (FIGS. 2, 3 and 4) or with an arcuate grating 41a (FIG. 5), depending upon the material which is to be run through the attachment. As seen in FIGS. 4 and 5, an arcuate deflector plate 42 is mounted on the rearward one of the trough flanges 22 by means of hinges 43 so that it may be swung between an upper position as seen in FIG. 4 or a lower position as seen in FIG. 5. A chain, wire, cable, rope or elastic band 44 may be secured to a bracket 45 on the deflector 42 and hooked onto any suitable and conveniently located member on the inside of the combine casing 11 in order to hold the deflector 42 in its upper position; while in its lower position the free edge 42a of the deflector is supported upon the upright stops 27. In the upper position of FIG. 4 the deflector 42 deflects substantially all the residue discharged from the rear of the combine into the trough 21. In the lower position of FIG. 5, light material, such as chaff, in the refuse is discharged over the deflector 42 and only such heavy material as cobs and husks is discharged under the free edge 42a of the deflector and into the trough. Where only large material in the residue is to be saved, the grating 41a is substituted for the solid closure 41 on the opening 40 so that almost any fine material which is discharged into the trough drops through the grating onto the ground rather than being fed into the impeller housing 28.

Mounted on the outer wall 29 of the impeller housing 28 is a bracket 46 which supports a pair of spaced bearing blocks 47, and journalled in the bearing blocks is an impeller shaft 48 which extends through the impeller housing wall 29 and has four impeller blades 49 mounted upon it within the housing 28. The portion of the impeller shaft 48 between the bearing blocks 47 mounts an input pulley 50 which is part of a first power transmission means, indicated generally at 51. On an outer end portion 48a of the impeller shaft 48, outside the outermost bearing block 47, is a pulley 52 which is a part of a second power transmission means, indicated generally at 53.

As best seen in FIG. 2, the first power transmission means 51 comprises a shaft 54 which extends through the upper portion of the impeller housing 28, through the sidewalls 29 and 30, and is journalled in bearings 55. Between the impeller housing wall 30 and the combine casing wall 13 the shaft 54 mounts a pulley 56, and a drive belt 57 is trained around the pulley 56 and the pulley 18 on the shaft 17 so that the shaft 54 is driven from the shaft 17. On the outer end portion of the shaft 54 is a pulley 58, and a drive belt 59 is trained around the pulley 58 and the input pulley 50 in order to drive the impeller shaft 48. As seen in FIG. 1, a stub shaft projecting outwardly from the impeller housing side wall 29 is movably mounted in any conventional manner, and a belt tensioning pulley 60 is journalled on said shaft for the purpose of tensioning the belt 59.

The second power transmission means 53 includes a cross shaft 61 which is journalled in bearing brackets 62 and extends parallel to the auger shaft 37. A first end portion 61a of the shaft 61 mounts a pulley 63, and a belt trained around said pulley and around the pulley 52 causes the cross shaft 61 to be driven from the impeller shaft 48 and thus from the first power transmission means 51. Mounted on the opposite end portion 61b of the cross shaft 61 is a pulley 65, and a drive belt 66 is trained around the pulley 65 and around the pulley 39 so that the second power transmission means 53 drives the auger shaft 37.

It is clear from the relative diameters of the pulleys 50 and 58 of the first power transmission means 51 that the impeller shaft 48 is rotated at about the same speed as the combine output shaft 17. Likewise, the relative diameters of the pulleys 52, 63, 65 and 39 of the second power transmission means 53 shows that the auger shaft 37 is rotated at a much lower speed than the impeller shaft 48.

Applicants have determined that an impeller speed of about 1400 rpm and an auger speed between about 80 and 120 rpm is the most satisfactory. Auger speeds above about 120 rpm tend to cause chaff to be thrown out of the trough 21 in spite of the arcuate deflector plate 42.

If desired, of course, the trough 20 may be formed of two telescoping parts to fit combines of different widths; and the auger shaft 37 and auger 38 can be made in sections to permit variations in the length of the conveyor.

The foregoing detailed description is given for clearness of understanding only and no unnecessary limitations should be understood therefrom as modifications will be obvious to those skilled in the art.

We claim:

1. A feed residue saver attachment for a combine which has a casing with sidewalls, and a chaffer screen in said casing, said attachment comprising:

a trough adapted to be detachably mounted in a transverse position beneath the rearward portion of a combine to receive residue from the chaffer screen which is usable for animal feed, and which the combine would otherwise discharge onto the ground, said trough having a rearward side and a forward side, an end plate on the trough adapted to extend downwardly from one sidewall of the casing, and the trough having an open end adapted to be adjacent the other sidewall;

conveyor means in the trough for moving residue toward said open end;

an impeller housing secured to said open end of the trough, there being an infeed opening in said housing to receive residue from the trough and a discharge opening in the housing which opens directly into a discharge duct;

an impeller journalled in the housing and rotatable to receive residue from the conveyor means and discharge it through said discharge opening and said discharge duct into a residue container adjacent the combine;

first power transmission means to drive the impeller from a driven shaft of the combine at a relatively high speed;

second power transmission means to drive the conveyor means from a driven shaft of said combine at a speed to deliver substantially 100% of the residue received by the trough into the impeller;

and a deflector plate at the rear of the trough extending upwardly into the combine casing behind the chaffer screen so as to direct residue carried off the rear of said screen downwardly into the trough.

2. The combination of claim 1 in which there is an opening in the bottom of the trough adjacent the open trough end, and there is a grating in said opening through which fine material in the residue may drop while the conveyor means may move large material such as cobs and husks across the grating into the impeller housing.

3. The combination of claim 2 which includes a hinge mounting the deflector plate on the rearward side of the trough, so said deflector plate may be adjusted to a position overlying the trough with a free edge spaced a short distance above the forward side of the trough so that said large material in the residue is directed by said deflector plate downwardly into the trough while most of said fine material is discharged by the combine over the top of said deflector plate.

4. The combination of claim 1 which includes a hinge mounting the deflector plate on said rearward side of the trough for movement between an upper position in which it deflects substantially all of said discharged residue downwardly, and a lower position in which it has a free edge spaced a short distance above the forward side of the trough so that principally large material such as cobs and husks in the discharged residue is deflected downwardly, and most fine material in the residue is discharged over the top of said deflector plate.

5. The combination of claim 4 in which there is an opening in the bottom of the trough adjacent the open trough end, and there are a solid closure and a grating either of which may be selectively secured in said opening, the mesh of said grating being such that fine material in the residue may drop through it while the conveyor means may move large material across the grating into the impeller housing, whereby said attachment may be selectively operated with the grating in the opening and the deflector plate in its lower position to pass substantially exclusively large material through the impeller housing, or with the solid closure in the opening and the deflector plate in its upper position to pass substantially all sizes of residue through the impeller housing.

6. The combination of claim 1 in which the impeller includes a shaft which has a portion projecting outside the housing on the side opposite the trough, in which the first power transmission means includes an input member fixed to said projecting portion, in which the conveyor means comprises an auger with a shaft, bearings supported on the trough end plate in which said shaft is journalled with an end portion outside said end plate, and in which the second power transmission means comprises a cross shaft alongside the trough, means for driving said cross shaft from the impeller shaft, and means for driving the auger shaft from the cross shaft.

7. The combination of claim 6 in which the first power transmission means includes means for driving the impeller shaft at a speed of about 1400 rpm and the second power transmission means includes means for driving the auger shaft in a speed range of about 80 rpm to about 120 rpm.

8. The combination of claim 1 in which the first power transmission means is constructed and arranged to drive the impeller at a speed substantially in excess of 1,000 rpm, the conveyor means comprises an auger with a shaft, and the second power transmission means is constructed and arranged to drive the auger shaft in a speed range of about 80 rpm to 120 rpm.

* * * * *